United States Patent [19]

Phillips

[11] 4,131,459
[45] Dec. 26, 1978

[54] HIGH TEMPERATURE RESISTANT CERMET AND CERAMIC COMPOSITIONS

[76] Inventors: James C. Fletcher, Administrator of the National Aeronautics and Space Administration, with respect to an invention of Wayne M. Phillips, La Crescenta, Calif.

[21] Appl. No.: 858,766

[22] Filed: Dec. 8, 1977

Related U.S. Application Data

[62] Division of Ser. No. 633,876, Nov. 20, 1975, Pat. No. 4,072,532.

[51] Int. Cl.$^2$ ............................................. C22C 29/00
[52] U.S. Cl. ........................................ 75/203; 75/205; 75/206; 75/212; 75/226; 264/60
[58] Field of Search .................. 75/203, 205, 206, 212, 75/226; 264/60

[56] References Cited

U.S. PATENT DOCUMENTS

| | | | |
|---|---|---|---|
| 3,526,485 | 9/1970 | Dawihl et al. | 75/235 |
| 3,900,626 | 8/1975 | Brennan | 264/60 |
| 3,914,500 | 10/1975 | Prennan et al. | 264/60 |

Primary Examiner—Brooks H. Hunt
Attorney, Agent, or Firm—Monte F. Mott; John R. Manning; Wilfred Grifka

[57] ABSTRACT

Cermet compositions having high temperature oxidation resistance, high hardness and high abrasion and wear resistance, and particularly adapted for production of high temperature resistant cermet insulator bodies, comprising a sintered body of particles of a high temperature resistant metal or metal alloy, preferably molybdenum or tungsten particles, dispersed in and bonded to a solid solution formed of aluminum oxide and silicon nitride, and particularly a ternary solid solution formed of a mixture of aluminum oxide, silicon nitride and aluminum nitride. Also disclosed are novel ceramic compositions comprising a sintered solid solution of aluminum oxide, silicon nitride and aluminum nitride.

The cermet compositions are designed particularly to provide high temperature resistant refractory coatings on metal substrates, preferably molybdenum or tungsten substrates.

15 Claims, 4 Drawing Figures

HIGH TEMPERATURE RESISTANT CERMET AND CERAMIC COMPOSITIONS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 633,876, filed Nov. 20, 1975 now U.S. Pat. No. 4,072,532.

BACKGROUND OF THE INVENTION

1. Field of the Invention

This invention relates to production of cermet compositions wherein particles of a metal or metal alloy, are dispersed in a matrix of a ceramic material, and is particularly concerned with the production of cermet compositions of the above type, having high temperature oxidation resistance, high strength and hardness, and high abrasion and erosion resistance, and particularly designed for use as cermet seals for thermionic converters and diodes, and with the production of high temperature oxidation resistant ceramics particularly useful in the production of such cermet compositions. The invention is also concerned with procedure for producing said cermet and ceramic compositions.

2. Description of the Prior Art

It is known to strengthen high temperature resistant metals by adding ceramic or refractory metal oxides thereto. It is also known to incorporate high temperature resistant metals into ceramic materials or refractory metal oxides, in order to increase adhesion of the ceramic material or refractory metal oxide to a metal substrate, to provide high temperature resistance refractory coatings on such metal substrates.

In my U.S. application Ser. No. 348,422, filed Apr. 5, 1973, there is disclosed a high strength cermet composition comprising a sintered body consisting of high temperature resistant metal or metal alloy particles such as niobium or niobium alloys, coated with and dispersed in a continuous matrix of a ceramic oxide such as alumina, yttria or zirconia, and particularly designed for use as cermet seals for thermionic diodes. Although such cermet compositions have been found to be advantageous, cermets having even higher temperature oxidation resistance for application as seals for thermionic converters are required. Also, cermets having improved hardness, and high abrasion and erosion resistance, coupled with high oxidation resistance are required especially for applications such as the production of turbine blades.

NATURE PHYSICAL SCIENCE, VOLUME 238, NO. 80, Pages 28, 29, July 10, 1972, discloses ceramics obtained by hot pressing mixtures of silicon nitride and alumina to form a single phase solid solution, known as the Si—Al—O—N system.

DESCRIPTION OF THE INVENTION

In accordance with the present invention it has now been found that cermet bodies, particularly having high temperature oxidation resistance, high strength and abrasion resistance, as well as resistance to thermal shock are provided, comprising particles of molybdenum or tungsten, coated with and dispersed in a solid solution of certain ceramic oxides, particularly aluminum oxide ($Al_2O_3$) and silicon nitride ($Si_3N_4$). These two ceramic materials, during sintering, form a very stable solid solution, and in this state, it has been found that the silicon nitride cannot react with the refractory metal, i.e. molybdenum or tungsten, to form a silicide, so that the resulting cermet retains its structural integrity. Further, the solid solution retains the crystal structure of the silicon nitride so that the cermet has very high abrasion resistance, good strength at high temperatures as well as resistance to thermal shock and oxidation, while at the same time having good adhesion to substrate metals such as molybdenum or tungsten, due to the molybdenum or tungsten content of the cermet.

As a particular feature of the invention, it has been found that a novel ceramic composition comprising a solid solution of certain ceramic oxides, particularly aluminum oxide, silicon nitride and aluminum nitride (AlN), when combined with certain high temperature resistance metals, particularly molybdenum or tungsten, results in the production of a highly valuable cermet having in addition to those properties noted above, including excellent bonding to such metals, high oxidation resistance, and good abrasion and wear resistance, low coefficient of friction and high hardness equivalent to and superior to tungsten carbide.

As previously noted, the cermet compositions of the invention are particularly designed as high temperature resistant electrical insulators, especially for use as seals for thermionic converters or diodes. However, the cermet bodies produced according to the invention can have wide application and can be employed wherever a pure ceramic can be used, while at the same time providing the above noted properties and advantages, including very high strength and high thermal shock resistance. Other diverse applications include use of the cermet, for example, as turbine blades, coal gasification equipment including powdered coal feed nozzles, reentry shields fpr space vehicles, and the like, taking advantage of the high abrasion and erosion resistance coupled with oxidation resistance of the cermet, as medical implants for rebuilding bones and joint structures of the body, and taking advantage of the very high hardness, which produces low wear rates, good biocompatibility, and capability of producing surfaces with controlled porosity to allow bone and tissue ingrowth. The cermets and novel ceramics formed of the three component single phase solid solution of aluminum oxide, silicon nitride and aluminum nitride are particularly advantageous in fabricating body joints such as hip joints, and as tooth and bone implants. The foregoing novel three-component ceramic composition and cermets produced therefrom employing molybdenum and tungsten as metal components, can be employed for very high hardness applications such as sand blast nozzles and the production of machine tools, as a substitute for tungsten carbide in such applications.

Thus, the ceramic compositions employed in producing the improved cermets according to the invention are two-component single phase solid solutions consisting of certain ceramic oxides, particularly aluminum oxide, and silicon nitride, and especially three-component single phase solid solutions of such ceramic oxides, particularly aluminum oxide, silicon nitride and aluminum nitride.

The ceramic oxide component can be any of the oxides, also known as sesquioxides, of the group consisting of aluminum oxide ($Al_2O_3$), yttrium oxide ($Y_2O_3$), and chromium oxide ($Cr_2O_3$), employed separately or in combination. The preferred ceramic oxide for producing the solid phase ceramic compositions employed in producing the cermets of the invention, is aluminum oxide. However, mixtures of such ceramic oxides, particularly aluminum oxide together with yttrium oxide and/or chromium oxide, can be employed. Particularly preferred combinations are those of aluminum oxide and yttrium oxide, preferably in proportions of about 1 to about 10% yttrium oxide and about 90 to about 99% aluminum oxide, by weight. Similar combinations of aluminum oxide and chromium oxide in amounts for example of about 1 to about 10% of chromium oxide and about 90 to about 99% of aluminum oxide, by weight, can also be employed.

The ceramic solid solutions employed for producing the cermets of the invention are preferably comprised of certain molar proportions of the above noted ceramic oxide and silicon nitride for production of the two-component solid solution, and also of certain molar proportions of the above ceramic oxide, silicon nitride and aluminum nitride for producing the novel three-component solid solutions.

The invention will be more clearly understood from the detailed description below taken in connection with the accompanying drawing wherein.

Figure 1:
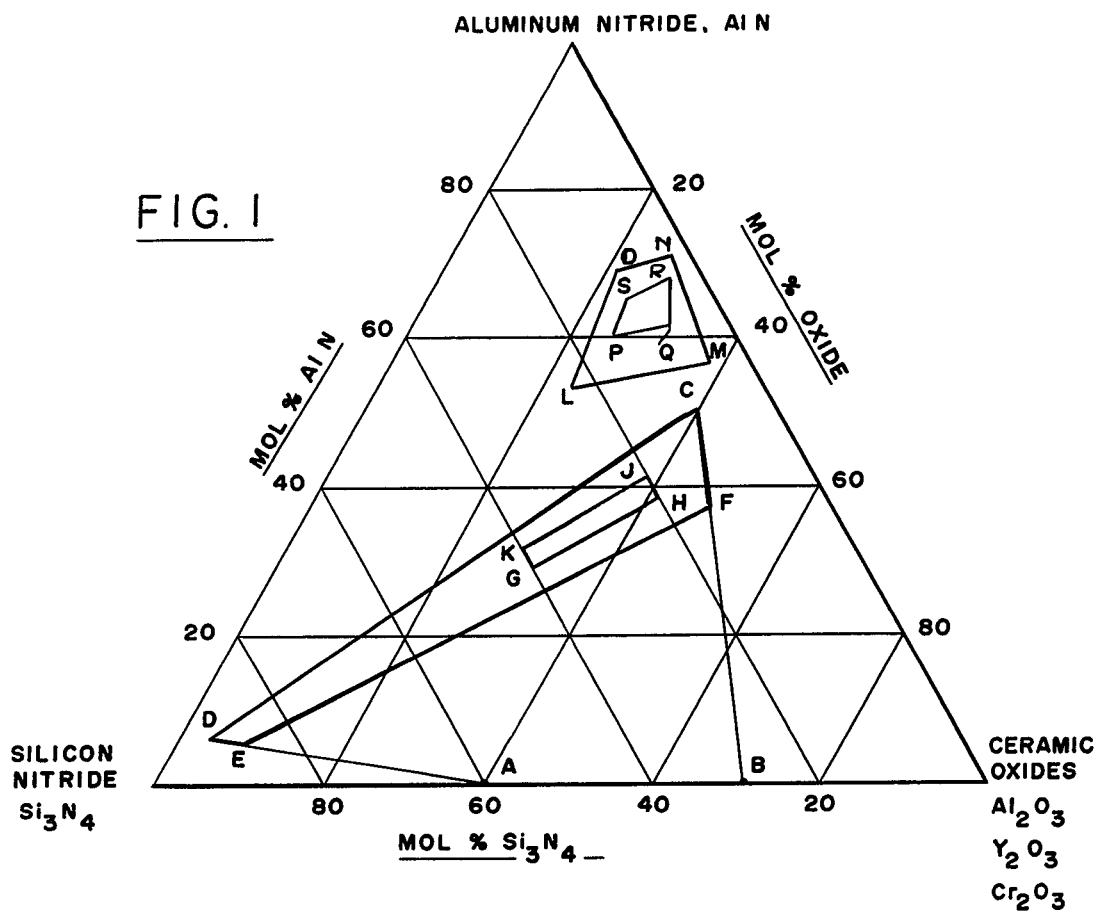
FIG. 1 is a pseudo ternary diagram of ceramic solid solutions according to the invention.

The ternary diagram of FIG. 1 of the drawing shows the composition of the ceramic solid solutions employed for producing the cermets of the invention, and wherein the areas setting forth the general ranges of proportions, the preferred ranges of proportions, and the optimum ranges of proportions of silicon nitride, ceramic oxide, e.g. aluminum oxide, and aluminum nitride, in terms of mol percent of the respective components, is defined. Thus, the area of the ternary diagram bounded by the points A, B, C and D covers both the two component and certain three component ceramic solid solutions, in terms of mol proportions or percentages of the respective components of the solid solutions which can be employed for producing the invention cermet compositions. It will be noted that the two component solid solutions of silicon nitride and ceramic oxide such as aluminum oxide, are defined by the line connecting points A and B, in terms of mol percent of these two components. The composition of certain preferred three-component novel ceramic solid solutions of the invention in terms of mol proportions or percentages of the respective three components including also aluminum nitride, is defined by the area bounded by the points E, F, C and D. The composition of certain optimum three component novel ceramic solid solutions of the invention is defined by the narrow rectangular area bounded by the points G, H, J and K, in terms of molar proportions or percentages of the components, which is within the area bounded by the preferred three-component ceramic solid solutions defined by the points E, F, C and D. It will be noted that both the above preferred and the optimum novel ceramic solid solutions of the invention are encompassed within the broad general range of cermet solid solutions defined by the area A, B, C and D.

The compositions of the solid solutions at the points A, B, C, D, E, F, G, H, J and K, defining the boundaries of the above noted broad, preferred and optimum ranges of ceramic compositions, in terms of mol percent of the three components are set forth in the table below.

TABLE I

| | | POINTS (mol %) | | | |
|---|---|---|---|---|---|
| | | A | B | C | D |
| Broad Range | AlN | 0 | 0 | 50 | 6 |
| | Al$_2$O$_3$ | 40 | 70 | 40 | 4 |
| | Si$_3$N$_4$ | 60 | 30 | 10 | 90 |
| | | E | F | C | D |
| Preferred Range | AlN | 5 | 38 | 50 | 6 |
| | Al$_2$O$_3$ | 8 | 47 | 40 | 4 |
| | Si$_3$N$_4$ | 87 | 15 | 10 | 90 |
| | | G | H | J | K |
| Optimum Range | AlN | 27 | 37 | 43 | 33 |
| | Al$_2$O$_3$ | 33 | 43 | 37 | 27 |
| | Si$_3$N$_4$ | 40 | 20 | 20 | 40 |

It will be seen from the table above and the ternary diagram in the drawing, that the broad range of ceramic solid solutions encompasses the two-component solid solutions having a composition defined by line A, B, ranging from 30 to 60 mol % silicon nitride and from 40 to 70 mol % of the oxide, e.g. aluminum oxide, and 0 mol % of aluminum nitride. The three component preferred and novel ceramic solid solutions defined by the area E, F, C and D encompass solid solutions having an amount of silicon nitride ranging from about 10 to about 90 mol %, an amount of ceramic oxide, e.g. aluminum oxide, ranging from about 4 to about 47 mol % and an amount of aluminum nitride ranging from about 5 to about 50 mol %. The optimum novel ceramic solid solution compositions defined by the area G, H, J and K encompass compositions having an amount of silicon nitride ranging from about 20 to about 40 mol %, an amount of oxide, e.g. aluminum oxide, ranging from about 27 to about 43 mol % and an amount of aluminum nitride ranging from about 27 to about 43 mol %.

In preferred practice with respect to the above three-component compositions, aluminum nitride can be added to any solid solution of silicon nitride and the oxide such as aluminum oxide, up to the amount of such oxide present, or slightly more. Broadly, in such three-component compositions as defined above, there can be employed in the range from about 10 to about 90 mol % of the combination of the oxide, e.g. aluminum oxide, and aluminum nitride, preferably from about 40 to about 80 mol % of the combination of these two components, with amounts of the oxide and aluminum nitride throughout these ranges preferably being approximately equal. Although the proportions of aluminum nitride to the oxide such as aluminum oxide can range up to 60 mol % aluminum nitride and 40 mol % of the oxide, it is preferred not to employ more than about 50 mol % aluminum nitride in admixture with the oxide such as aluminum oxide.

Other preferred three component novel ceramic solid solutions according to the invention in terms of mol percentages of the above noted three components, is defined by the area bounded by the points L, M, N and O in FIG. 1. The composition of optimum three component novel ceramic solid solutions of this type is defined by the area bounded by points P, Q, R and S, in terms of molar percentages of the components, and which is within the area bounded by the points L, M, N and O.

The compositions of the solid solutions at the points L, M, N, O, P, Q, R and S, defining the boundaries of the above noted preferred and optimum ranges of this series of ceramic solid solutions, in terms of mol percent of the three components is set forth in Table II below.

TABLE II

|  |  | POINTS (mol %) | | | |
| --- | --- | --- | --- | --- | --- |
|  |  | L | M | N | O |
| Preferred | AlN | 55 | 57 | 72 | 70 |
| Range | $Al_2O_3$ | 23 | 38 | 25 | 21 |
|  | $Si_3N_4$ | 22 | 5 | 3 | 9 |
|  |  | P | Q | R | S |
| Optimum | AlN | 60 | 62 | 68 | 65 |
| Range | $Al_2O_3$ | 26 | 31 | 28 | 24 |
|  | $Si_3N_4$ | 14 | 7 | 4 | 11 |

It will be seen from the above Table II and the ternary diagram in the drawing, that the series of three component novel ceramic solid solutions defined by the area L, M, N and O encompass solid solutions having an amount of silicon nitride ranging from about 3 to about 22 mol %, an amount of ceramic oxide, e.g. aluminum oxide, ranging from about 21 to about 38 mol % and an amount of aluminum nitride ranging from about 55 to about 70 mol %. The optimum novel ceramic solid solution compositions within the above preferred series of solid solutions and defined by the area P, Q, R and S encompass compositions having an amount of silicon nitride ranging from about 4 to about 14 mol % an amount of oxide, e.g. aluminum oxide, ranging from about 24 to about 28 mol % and an amount of aluminum nitride ranging from about 60 to about 68 mol %.

As previously noted, the metal particles which are dispersed in and coated with the ceramic solid solutions for producing the cermet compositions of the invention, are preferably molybdenum or tungsten, such metals being preferred for their matching thermal coefficients with those of the above described ceramic solid solutions, particularly the novel three component ceramic solid solutions of the invention.

However, particles or spheres of other high temperature resistant metal or metal alloys also can be employed, such alternative metals including, for example, tantalum and niobium (columbinum). Particularly when employing the latter metals, it has been found that preferred cermets of very high hardness can be obtained when such metals are coated with and dispersed in solid solutions within the area defined by points L, M, N and O, and particularly within the area defined by points P, Q, R and S of the ternary diagram.

The ceramic solid solutions of the invention, particularly the above described novel three-component ceramic solid solutions, are produced by sintering the components, namely the oxide, e.g. aluminum oxide, silicon nitride and aluminum nitride, in powder form, at temperature ranging from about 1,700° to about 2,000° C., preferably by hot pressing under pressures, e.g. ranging from about 1,000 to about 10,000, preferably about 1,000 to about 5,000, psi. Such procedure results in a solid solution (a "sialon") which has structural integrity as well as very high abrasion, erosion and oxidation resistance.

When producing the cermet, a mixture of the metal particles, such as molybdenum and/or tungsten particles, and the components forming the above described ceramic solid solution, preferably is placed in an autoclave or a hot press, in association with a suitable metal substrate, and this combination is subjected to elevated temperatures and pressures as described immediately above, forming the ceramic solid solution and at the same time bonding the refractory metal particles of the mixture to the ceramic solid solution surrounding such particles, to produce a strong bond between such metal particles and the ceramic solid solution matrix, resulting in a high strength interfacial bond between such particles and the ceramic solid solution matrix, and a cermet body of high strength and having the additional advantageous properties noted above. In the resulting cermet composition, the metal, e.g. molybdenum or tungsten, particles are coated with and dispersed in and bonded to a continuous matrix of the ceramic solid solution.

In carrying out the process for producing the cermet composition of the invention, the metallic particles of molybdenum or tungsten are first preferably sieved to obtain uniform particle size and eliminate fine particles, preferably less than 0.001 inches in diameter, so as to obtain metal particles having a diameter generally ranging from about 0.001 inches to about 0.125 inches, preferably from about 0.001 inches to about 0.010 inches in diameter.

The metallic particles are then preferably washed in soap or detergents, and water, and rinsed. Preferably biodegradable detergents free of phosphates are employed, since these do not leave a static charge on the particles. An alkaline type detergent marketed as "Shaklee's Basic I" has been found effective, but any soap or detergent can be employed which will remove any grease or processing residue on the metal particles.

The washed metallic particles are then further preferably washed in acetone and dried. However, any solvent can be used which evaporates clean from the particles, including alcohol and benzene. Solvents such as kerosene are not desirable since they tend to form a residue on the particles.

The mixture of particles of the ceramic components, e.g. aluminum oxide, silicon nitride and aluminum nitride, are sieved to eliminate coarse particles, preferably particles of a size greater than 1/10 of the size of the metallic particles. Thus, the size of the ceramic particles is preferably less than 1/10 the diameter of the metal particles. Usually, the ceramic particles are of a size ranging from about 0.01 to about 0.05 the diameter of the metal particles or spheres.

The proportions of metal particles to the ceramic powder mixture can vary. The greater the proportion of metal particles to the ceramic powder forming the ceramic solid solution, the better the mechanical properties, particularly tensile strength of the resulting cermet, and the better the adhesion characteristics of the cermet to a metal substrate. However, sufficient cermet mixture in relation to metal powder is required to permit coating the metal particles with the sintered ceramic solid solution so as to provide a uniform coating of the ceramic solid solution around the metal particles. Generally from about 5 to about 40%, preferably about 15 to about 30%, by volume of the metal, e.g. molybdenum or tungsten, particles or spheres can be present in the total composition of metallic particles and ceramic powder.

In preferred practice, prior to mixing the metal particles or powder with the ceramic mixture or powder, a binder is added to the metal particles to aid in obtaining a more uniform coating of the ceramic powder on the metal particles, and a more uniform dispersion of such particles within the ceramic matrix. Preferred binders for this purpose are any suitable wax, for example, paraffin wax, carnauba wax or beeswax. Preferably, the wax is applied warm, that is in melted condition, or it can be applied in a solvent solution, to the metal particles, to uniformly coat the particles with the binder. A suitable material is a solution of benzene saturated with beeswax. The coating of the metal particles with the wax can be conveniently accomplished by warm ball milling the metal particles or spheres with the melted wax or by placing the metal particles in a solvent solution of the wax, e.g. benzene saturated with beeswax, decanting excess solution and drying the particles.

Although not as desirable, alternative binders also can be employed, such as polyvinyl alcohol, aqueous soap solution, amyl acetate, butyl acetate, and nitrocellulose diluted with butyl alcohol.

Usually, only sufficient binder is employed to obtain a thin layer or coating of the binder on the metal or metal alloy particles. The amount of binder generally employed to achieve this result can range from about 1 to about 10% by volume of the mixture of metal or metal alloy particles, and binder.

If desired, a small amount of binder also can be added to the ceramic oxide powder, in addition to adding the binder to the metal particles, as described above, prior to mixing such metal or metal alloy particles with the ceramic oxide powder. However, usually the addition of the binder to the ceramic oxide powder is not necessary, where as in preferred practice, the binder is added to the metal or metal alloy particles.

The metal particles, preferably coated with a binder such as beeswax or paraffin, as noted above, is then mixed with the ceramic components mixture under conditions to obtain a homogeneous mixture of metal particles or spheres, uniformly coated with the ceramic powder. Preferably, the mixture is warmed slightly, e.g. at temperature ranging from about 30 to about 60° C. to provide greater adherence of the coated metal particles to the ceramic powder. The mixture is processed as by tumbling to permit the ceramic particles to adhere to the wax coating on the metal particles, thus coating the metal particles with the ceramic particles. The tumbled mixture is then preferably sieved to break up any clusters of the metallic particles.

The resulting mixture is then subjected to firing or sintering at high temperature and pressure to produce the high temperature, hard and shock resistant cermet according to the invention. This is effectively accomplished by placing the mixture composed of the metal particles distributed in and coated with the ceramic particles, in an autoclave or hot press for carrying out a high pressure, high temperature autoclaving operation. This operation is generally carried out at an elevated temperature which is below the melting point of the metal, e.g. molybdenum or tungsten, particles of the mixture, or the melting temperature of the substrate, such as molybdenum or tungsten, to which the cermet coating is applied. Generally, such sintering operation is carried out at temperature generally ranging from about 1,700° to about 2,000° C. Pressures during the sintering operation can range generally from about 1,000 to about 10,000 psi, usually about 1,000 to about 5,000 psi. Time for sintering or autoclaving generally can range from about 10 to about 60 minutes. As previously noted, such sintering operation results in the formation of a ceramic solid solution which coats and bonds the metal particles to the ceramic solid solution matrix, resulting in the cermet body of the invention having highly improved properties of hardness, strength, oxidation resistance and resistance to abrasion.

The exposed metal particles or spheres at the surfaces of the cermet body form metallic anchors which extend into the cermet structure so that the metallic substrates which may be attached to the cermet body, and which may have the same composition, such as molybdenum or tungsten, as the metal particles of the cermet body, are more readily anchored to the cermet body by means of the strong interfacial bond between such exposed particles at the surface of the cermet body and the adjacent metal substrate.

The cermet bodies of the invention comprising the metal, e.g. molybdenum or tungsten particles, dispersed in the continuous matrix of ceramic solid solution, have substantially the same proportions of metal particles or spheres, and ceramic material, based on the original starting mixture of these components noted above for producing the cermet bodies of the invention. However, the density of the ceramic particles in the cermet body is increased because of the hot pressing operation. Accordingly, the proportion of metal particles in the cermet ranges from about 10 to about 90%, preferably from about 25 to about 70%, by weight, the remainder being ceramic solid solution.

The cermet bodies produced according to the invention have high hardness and strength, corresponding to a micro hardness of about 1,000 to about 2,000 Kg/mm$^2$ and a tensile strength generally ranging from about 20,000 to about 150,000 psi. The cermet bodies of the invention have high temperature resistance up to about 1,350° C. or higher, and the cermet bodies hereof also have high electrical insulation effectiveness. For example, a cermet body formed of molybdenum or tungsten particles and a ceramic solid solution comprised of the three components aluminum oxide, silicon nitride and aluminum nitride has an electrical insulation effectiveness in excess of 5 megohm-cms at room temperature.

The following are examples of practice of the invention, but it is understood that such examples are not intended as limitative of the invention.

EXAMPLE 1

Molybdenum particles of 0.001 inches in diameter were sieved and washed in "Shaklee Basic I" solvent, then washed in acetone and dried.

The molybdenum particles were then placed in a solution of benzene saturated with beeswax. Excess solvent was drained off and the resulting molybdenum particles coated with beeswax were then dried.

A mixture of 33 mol % aluminum oxide, 1 mol % yttrium oxide, 33 mol % silicon nitride and 33 mol % aluminum nitride, was sieved to remove coarse particles and provide a resulting ceramic powder of a particle size less than about 0.0001 inches diameter.

The wax coated molybdenum particles were then mixed with the ceramic powder, in a proportion of 30% of the molybdenum particles and 70% of the ceramic mixture, by volume, and the resulting mixture was tumbled. Following tumbling, the mixture of ceramic particles adhering to the wax coated surface of the molybdenum particles and thus coating the molybdenum particles with the ceramic particles, was placed over a molybdenum metal substrate in a hot press. A layer of pure ceramic powder as described above was then placed over the cermet powder comprised of the mixture of metal particles and ceramic, and the resulting arrangement was then hot pressed at 1,800° C. at 4,000 psi for about 15 minutes.

Figure 2:
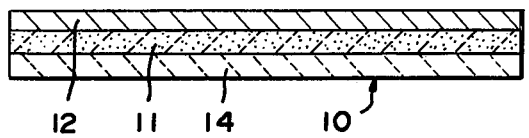
FIG. 2 illustrates a composite comprised of a substrate, cermet and ceramic according to the invention.

Referring to FIG. 2 of the drawing, the final sintered product was a composite 10 of a cermet 11 comprised of molybdenum particles dispersed and bonded to a matrix of solid solution of aluminum oxide, yttrium oxide, silicon nitride and aluminum nitride, such cermet 11 being bonded to and forming a coating on the molybdenum substrate 12, the cermet body 11 being coated with and bonded on its opposite surface to the pure ceramic solid solution of aluminum oxide, yttrium oxide, silicon nitride and aluminum nitride, as indicated at 14.

The above optimum ceramic solid solution 14 and the cermet of molybdenum particles dispersed in such solid solution, as indicated at 11, particularly have properties of high hardness, good abrasion and wear resistance similar to tungsten carbide, and have a low coefficient of friction, and high oxidation resistance, far superior to tungsten carbide.

EXAMPLE 2

The procedure of Example 1 was repeated, employing tungsten particles, and a two-component ceramic powder consisting of 60 mol % aluminum oxide and 40 mol % silicon nitride. The ceramic powder and wax coated tungsten particles were mixed in proportions of 20% tungsten particles and 80% ceramic particles, by volume.

Following tumbling, the resulting cermet mixture was hot pressed in contact with a tungsten substrate on one side and pure ceramic mixture of 60% aluminum oxide and 40% silicon nitride, by volume, on the opposite side. The hot pressing operation was carried out at 1,900° C. and at pressure of about 6,000 psi for a period of about 15 minutes.

The resulting composite produced following hot pressing and sintering was similar to the composite produced in Example 1. However, the ceramic and cermet bodies, components of such composite, while having properties of high oxidation resistance, abrasion resistance and thermal shock resistance, had substantially less hardness than the corresponding optimum pure ceramic and optimum cermet components of the composite produced according to Example 1.

The composites produced according to Examples 1 and 2 above, can be employed as oxidation resistant coatings for molybdenum and tungsten, and as wear resistant surfaces in bearings and as machine tool bits.

EXAMPLE 3

The procedure of Example 1 was followed for producing the cermet, employing molybdenum particles and a ceramic mixture comprised of 30 mol % aluminum oxide, 30 mol % aluminum nitride and 40 mol % silicon nitride, the metal particles and ceramic particles being mixed in proportions of 25% molybdenum particles and 75% ceramic particles, by volume.

The mixture of molybdenum particles and ceramic powder to form the cermet was placed in a hot press over a molybdenum substrate, pure ceramic mixture as described above was placed over the cermet mixture, another layer of cermet mixture was placed over the pure ceramic, and a molybdenum substrate was then placed over the upper layer of cermet mixture. The assembly was then hot pressed at 1,800° C. at 4,000 psi for about 15 minutes.

Figure 3:
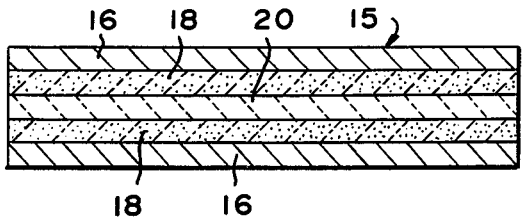
FIG. 3 illustrates another composite comprised of another arrangement of substrate, cermet and ceramic components, in accordance with the invention.

Referring to FIG. 3 of the drawing, a high temperature electrically insulating composite 15 was thus produced comprised of outer molybdenum layers 16, each having adjacent layers 18 of cermet comprised of mulybdenum particles coated with and dispersed in a solid solution of aluminum oxide, aluminum nitride and silicon nitride, with a layer 20 of pure ceramic solid solution of aluminum oxide, aluminum nitride and silicon nitride in the center between the cermet layers 18. The composite produced in this example can be employed as seals for thermionic converters and for other electrically insulating applications.

EXAMPLE 4

A mixture of 30 mol % aluminum oxide, 30 mol % aluminum nitride and 40 mol % silicon nitride was sieved to produce a mixture having a particle size less than 0.0001 inches in diameter.

Such ceramic mixture was placed in a hot press and subjected to sintering at temperature of about 1,800° C. at 5,000 psi pressure for about 15 minutes.

The resulting sintered ceramic body formed of a solid solution of aluminum oxide, aluminum nitride and silicon nitride had very high hardness, high abrasion and wear resistance similar to tungsten carbide, low coefficient of friction and high oxidation resistance.

The ceramic of this example can be employed in the fabrication of turbine blades.

EXAMPLE 5

The procedure of Example 3 was followed except that a different arrangement of the materials was assembled in the hot press. In this example the cermet mixture was placed in the hot press over the pure ceramic mixture, molybdenum particles were then placed over the pure ceramic layer, followed by a layer of cermet mixture and finally a layer of pure ceramic mixture.

Figure 4:
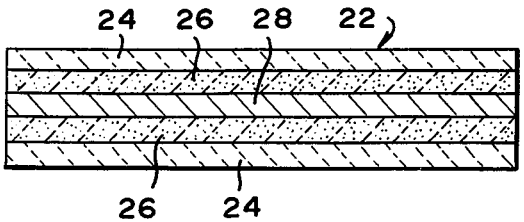
FIG. 4 illustrates a composite similar to FIG. 3.

Referring to FIG. 4 of the drawing, a composite 22 was obtained comprised of outer layers 24 of pure ceramic solid solution of aluminum oxide, aluminum nitride and silicon nitride, with adjacent layers 26 of cermet comprised of molybdenum particles in a solid solution of aluminum oxide, aluminum nitride and silicon nitride, and a center molybdenum layer 28.

The above composite having high hardness is effective for use as tooth implants and hip joint implants.

EXAMPLE 6

A mixture of 27 mol % aluminum oxide, 64 mol % aluminum nitride and 9 mol % silicon nitride was sieved to produce a mixture having a particle size less than 0.0001 inches in diameter.

Such ceramic mixture was placed in a hot press and subjected to sintering at temperature of about 1,875° C. at 5,000 psi pressure for about 45 minutes to one hour.

The resulting sintered ceramic body formed of a solid solution of aluminum oxide, aluminum nitride and silicon nitride had very high hardness, high abrasion and wear resistance similar to tungsten carbide, low coefficient of friction and high oxidation resistance.

The ceramic of this example can be employed in the production of medical implants.

EXAMPLE 7

The procedure of Example 1 was carried out, employing tantalum particles of 0.001 inches to about 0.010 inches in diameter, and using the ceramic mixture described in Example 6.

The wax coated tantalum particles were mixed with the ceramic powder, in a proportion of 25% of the tantalum particles and 75% of the ceramic mixture, by volume.

Following tumbling and mixing of the ceramic particles and the wax coated tantalum particles, the resulting mixture was placed over a tantalum substrate in a hot press. A layer of pure ceramic mixture as described in Example 6 was then placed over the cermet powder comprised of the mixture of metal particles and ceramic, and the resulting arrangement was then hot pressed at 1,875° C. and at 5,000 psi for about 45 minutes.

The final sintered product was a composite of a cermet comprised of tantalum particles dispersing in and bonded to a matrix of solid solution of aluminum oxide, silicon nitride and aluminum nitride, such cermet bonded to and forming a coating on the tantalum substrate, the cermet body being coated with and bonded on its opposite surface to the pure ceramic solid solution as described above.

The above composite has properties of high hardness, abrasion and wear resistance, and oxidation resistance superior to tungsten carbide. Such composite can be employed effectively as body implants.

From the foregoing, it is seen that the invention provides novel cermet compositions and novel ceramic compositions, formed of solid solutions, particularly three component solid solutions, of a ceramic oxide such as aluminum oxide, silicon nitride and aluminum nitride, particularly in certain molar proportions, providing excellent hardness, high strength, and high temperature oxidation, erosion and thermal shock resistance, and having a wide variety of applications, e.g. for use as electrical insulation seals for thermionic converters.

While I have described particular embodiments of the invention for purposes of illustration, it will be understood that various changes and modifications can be made therein within the spirit of the invention, and the invention accordingly is not to be taken as limited except by the scope of the appended claims.

What is claimed is:

1. A process for producing a high temperature oxidation resistant cermet composition which comprises sintering a mixture of (a) metal or metal alloy particles and (b) a ceramic material comprising silicon nitride and an oxide selected from the group consisting of aluminum oxide, yttrium oxide and chromium oxide, to form a cermet composition of said metal or metal alloy particles coated with and dispersed in a solid solution of said ceramic material.

2. A process as defined in claim 1, said mixture including aluminum nitride.

3. A process as defined in claim 1, said metal or metal alloy particles being metal particles selected from the group consisting of molybdenum, tungsten, tantalum and niobium particles, said sintering being carried out by hot pressing said mixture at temperature ranging from about 1,700° to about 2,000° C.

4. A process as defined in claim 2, said metal or metal alloy particles being metal particles selected from the group consisting of molybdenum, tungsten, tantalum and niobium particles, said sintering being carried out by hot pressing said mixture at temperature ranging from about 1,700° to about 2,000° C.

5. A process as defined in claim 3, said mixture containing about 5 to about 40% by volume of said metal particles.

6. A process as defined in claim 4, said mixture containing about 5 to about 40% by volume of said metal particles.

7. A process as defined in claim 3, said metal particles ranging in size from about 0.001 inches to about 0.125 inches in diameter, said ceramic material consisting of particles of a size less than 1/10 the diameter of said metal particles.

8. A process as defined in claim 3, said ceramic material containing about 30 to about 60 mol % silicon nitride, about 40 to about 70 mol % of said oxide.

9. A process as defined in claim 6, said ceramic material consisting of about 10 to about 90 mol % of the combination of aluminum nitride and said oxide, the mol proportions of aluminum nitride and said oxide in said combination being approximately equal, and about 10 to about 90 mol % silicon nitride.

10. A process as defined in claim 3, said oxide being aluminum oxide.

11. A process as defined in claim 6, said oxide being aluminum oxide.

12. A process as defined in claim 6, wherein said oxide is a mixture of about 1 to about 10% yttrium oxide and about 90 to about 99% aluminum oxide, by weight.

13. A process as defined in claim 6, said metal or metal alloy particles being coated with a binder selected from the group consisting of paraffin wax, carnauba wax and beeswax.

14. A process as defined in claim 6, said ceramic material consisting of about 10 to about 90 mol % silicon nitride, about 4 to about 47 mol % of said oxide, and about 5 to about 50 mol % aluminum nitride.

15. A process as defined in claim 6, said ceramic material consisting of about 3 to about 22 mol % silicon nitride, about 21 to about 38 mol % of said oxide, and about 55 to about 70 mol % aluminum nitride.

* * * * *